Patented Apr. 25, 1944

2,347,435

UNITED STATES PATENT OFFICE 2,347,435

POLLEN ANTIGEN AND PROCESS OF PREPARING IT

George E. Rockwell, Cincinnati, Ohio, assignor to Eli Lilly and Company, Indianapolis, Ind., a corporation of Indiana No Drawing. Application June 11, 1941, Serial No. 397,560

10 Claims. (Cl. 167—78)

This invention relates to pollen antigens and the processes of preparing them.

An object of this invention is to effect immunity or desensitization to pollen-induced disturbances without dangerous systemic reactions.

Another object of this invention is to produce immunity or desensitization against pollen with fewer injections than with preparations heretofore employed.

Another object of this invention is to prolong the effect of pollen antigen whereby a greater immune response is obtained.

Another object of this invention is to secure a more purified pollen antigen than the pollen antigen heretofore employed by the elimination of substantial quantities of glucosides, coloring matter, and other nonspecific substances.

A more particular object of this invention is to protect by immunity or by desensitization those susceptible of hay fever with a markedly less number of treatments, and with appreciably less reaction than with the antigens heretofore employed for this purpose.

Those allergic to the various types of pollens suffer untold misery during the periods of the spring, summer, and fall months in which the particular variety or varieties of pollen to which they are susceptible are prevalent in the atmosphere. A change in locale is one escape, but precious few of the workaday world can consider that avenue. Much has been done to alleviate this condition. Perhaps the most effective method is by immunization or desensitization. One usual method involves the inoculation of those susceptible to hay fever with the extract of the specific pollen. Injections are given over a period, starting first with a small dose and gradually increasing the dosage until complete relief is obtained. Thus, the maximum dosage required varies with individual patients, seasons, and localities. In some instances a maximum of 3,000 to 4,000 units is sufficient. (The extract from one gram of pollen is equal to one million units.) The number who may be alleviated by this small maximum dose does not exceed 50 percent of those treated. Others require a much larger dose, and it is the usual practice of many allergists to continue increasing the dose until a maximum of 15,000 or more units is attained. After the maximum dose is reached, it is maintained at varying intervals, depending upon whether the treatment is preseasonal or perennial. To attain such a maximum, thirty or more injections are usually necessary. Due to the relatively rapid absorption of pollen, the maximum dosage must then be maintained at varying intervals until the hay fever season is terminated. The systemic reactions, particularly in some individuals, to this treatment are markedly pronounced and often dangerous. The prolonged series of treatments to effect immunity, the frequency of treatment after the maximum dosage has been administered, and the unpleasant systemic reactions incident to the use of the pollen extract all tend to discourage its more extensive use.

In accordance with this invention, immunity or desensitization is effected by the use of a pollen antigen which requires but one-third of the number of treatments to attain the maximum dosage as compared with the extract heretofore used. In addition, there is appreciably less systemic reaction when large doses are administered. The pollen antigen of this invention is relatively insoluble. Due to its relative insolubility, a maintenance dosage of 15,000 pollen units may be attained in about one-third of the treatments usually required for the conventional pollen extract. It is considerably purer than the extract, one gram of this dried pollen antigen being equivalent to at least five million pollen units. It is more slowly absorbed by the body with definitely less danger of systemic reactions. Because of slow absorption, a much greater concentration of units per dose may be administered without danger of reaction. Further, a prolongation of its antigenic action results and the number of treatments after the maintenance dosage has been attained is, as a consequence, greatly reduced.

The pollen antigen of this invention is prepared by treating an extract of pollen with a mineral acid, such as hydrochloric, sulfuric, or nitric acid. The pollen treated is desirably that for which treatment is desired. It may be any pollen from the vegetable kingdom, for example, weed pollen such as that from the giant ragweed, small ragweed, or plantain pollen, tree pollen such as oak or elm pollen, and grass pollens such as timothy, redtop, or June grass pollen; or it may be a mixture of pollens from different species. The pollen antigen of this invention is preferably administered parenterally. An extract of the desired pollen or mixture of pollens, defatted if desired, is prepared by any of the usual methods. This extract is subjected to the action of a mineral acid. To the agitated extract is added slowly the desired acid until the maximum precipitate is obtained. The amount of the acid required varies with the concentration of the extract, the temperature, type of acid used, and the buffer substances present in the extract. Desirably a sodium salt, preferably sodium chloride, is added to the extract prior to or after the addition of the mineral acid. With certain pollen extracts, such as the grass pollens, the addition of the sodium salt is essential. The mixture of the extract and acid desirably should have a pH of less than 1. The application of heat tends to reduce the antigenicity of the pollen and for that reason it is desirable to maintain all temperatures in the process of producing the antigen below 37° C. and preferably lower. A precipitate forms and, after a period of three or more hours, the excess acid and water are removed by any suitable means, such as by centrifugation, filtration, or decantation. The precipitate so produced is comminuted in a medium, such as normal physiological saline solution, in a sterile environment, such, for example, as a sterile porcelain mill or a sterile mortar and pestle. Desirably, the pollen antigen is reduced in size so that it passes through a 100-mesh sieve or is capable of passing freely through a 27-gauge needle. The mixture containing the antigen is then preferably adjusted to between pH 6.5 and 7.5, and a preservative, such as sodium ethyl mercuri thiosalicylate or phenol, is added.

The pollen antigen of this invention is desirably standardized on the basis of the maximum dilution which produces a skin reaction in a sensitive individual, the weight of the antigen, or the nitrogen content. Any one or all of these criteria may be employed for the standardization.

Examples of the general process of this invention are as follows:

*Example 1.*—Five grams of small ragweed pollen and 5 g. of large ragweed pollen (defatted pollen in each case may be used if desired) are extracted with 100 cc. of normal saline solution containing N/100 sodium hydroxide for 48 hours at a temperature of approximately 5° C. This extract is filtered first through filter paper and then through a Berkefeld or Seitz filter, if desired, for clarification and sterility. Although not necessary, 20 g. of sodium chloride are dissolved in the filtrate and, while being stirred, from 5 to 7 cc. of concentrated hydrochloric acid (37 percent) are added to the solution. The pH of the resulting mixture is less than 1. The resulting mixture is thoroughly agitated, stoppered tightly, and placed in an ice box until the precipitate (hydrochloride or double salt), which is the desired antigen, has flocculated out.

If desired, the sulfate or the nitrate of the pollen may be produced instead of the hydrochloride by using the corresponding acid and the sodium salt of that acid. The pollen antigen, being amphoteric, is a weak base and consequently forms salts with strong acids more easily than with weak acids. Also alkaline and double salts may be formed which, with exceptions, are soluble. The period required for the precipitate to flocculate out is usually from three to twenty-four hours. The mixture is then centrifuged until the precipitate is completely sedimented. The supernatant liquid is then decanted off. To approximately each 2 g. of the sediment, which is the desired antigen, are added 100 cc. of sterile physiological saline solution. The yield of the caked, but not dried, precipitate is approximately 0.2 g. for each gram of original pollen. The mixture is comminuted in a sterile mortar or a sterile porcelain mill. It is ground sufficiently fine and dispersed to flow through a 27-gauge needle or a 100-mesh sieve. The mixture is adjusted to pH 6.5 and the nitrogen content determined. A water solution of sodium ethyl mercuri thiosalicylate solution (1:1000) having a pH of 6.5 and sterile physiological saline solution having a pH of 6.5 are then added to give a final nitrogen concentration of 0.192 mg. of nitrogen per cc. and a proportion 1:10,000 of sodium ethyl mercuri thiosalicylate. Cultures are then made for sterility. One tenth gram of the air-dried pollen antigen as prepared by this process has at least one million pollen units when standardized by any of the well-known methods.

A comparison of the dosages required with pollen antigens heretofore used and the product produced in accordance with Example 1, which is an average of 4 cases treated, is indicated in the following table:

| Dosage in units using conventional extracts | Dosage in units using slow pollen antigen of this invention |
| --- | --- |
| 5<br>10<br>20<br>35<br>60<br>100<br>150<br>225<br>300<br>450<br>600<br>750<br>1,000<br>1,250<br>1,500<br>2,000<br>2,500<br>3,000<br>3,500<br>4,000<br>4,500<br>5,250<br>6,000<br>6,750<br>7,500<br>8,250<br>9,000<br>9,750<br>10,500<br>11,250<br>12,000<br>12,750<br>13,500<br>14,250<br>15,000 } 35 doses | 150<br>300<br>600<br>900<br>1,200<br>1,500<br>3,000<br>4,500<br>6,000<br>9,000<br>12,000<br>15,000 } 12 doses |

It is observed that it requires approximately 35 does of the conventional pollen antigen extracts to effect immunity, whereas with the pollen antigen of this invention but approximately one third or twelve doses are necessary. The pollen antigen of this example is especially effective for immunization or desensitization against the pollen in the atmosphere in the late summer and fall.

*Example 2.*—Ten grams of mixture of equal parts of the pollens of timothy, redtop, June grass, and orchard grasses are extracted for forty-eight hours at a temperature of approximately 5° C. with 100 cc. of normal physiological saline solution containing sufficient sodium hydroxide to insure that the extracting solution is definitely alkaline. This extract is filtered and 20 g. of sodium chloride are dissolved in the clear filtrate. To the solution are added 5 to 7 cc. of concentrated hydrochloric acid (37 percent), the amount which effects maximum precipitation of the antigen. The procedure described in Example 1 is then followed. This pollen antigen is particularly advantageous for parenteral administration against the pollen prevalent in the spring.

*Example 3.*—The process for treating equal parts of the small ragweed pollen and the large ragweed pollen described in Example 1 is followed except the small ragweed pollen alone is treated instead of the mixture. In the same manner as in Example 1, an extract of the small ragweed pollen is prepared, the extract is subjected to the action of hydrochloric acid and comminuted in normal physiological saline solution until sufficiently fine to pass through a 27-gauge needle.

The acid precipitated pollen antigen of this invention is slowly absorbed by the body, is approximately ten times as potent as the usual pollen antigen and, due to its relative insolubility, larger doses may be administered at one time without producing dangerous systemic reactions. Finally, due to its slow solubility, its antigenic action is prolonged for a far greater period with fewer injections than with the more soluble pollen antigen now used.

While preferred embodiments of the invention have been described, various modifications may be made therein without departing from the scope of the appended claims.

What is claimed is:

1. A mineral acid precipitated pollen antigen.

2. A mineral acid precipitated pollen antigen in a mixture with a liquid vehicle, said mixture having a pH between 6.5 and 7.5.

3. A pollen antigen comprising the product of the reaction of a pollen and hydrochloric acid, precipitated in the presence of a sodium salt.

4. A pollen antigen comprising a reaction product of a ragweed pollen and hydrochloric acid.

5. A pollen antigen comprising the reaction product of pollen and hydrochloric acid, in a mixture with a liquid vehicle, said mixture having a pH between 6.5 and 7.5.

6. The step in the process of producing a pollen antigen which comprises treating an extract of pollen with a sufficient amount of a mineral acid to reduce the pH to less than pH 1.

7. The process of producing a pollen antigen which comprises subjecting an extract of pollen to the action of an excess of a mineral acid and a sodium salt, and separating the resulting product from the excess of said acid.

8. The process of producing a pollen antigen which comprises subjecting an extract of pollen to the action of a mineral acid to produce precipitation, and separating the precipitate so formed from the supernatant liquid.

9. A mineral-acid precipitated pollen antigen in a mixture with a liquid vehicle, said mixture having a pH of not more than 7.5.

10. A pollen antigen comprising the reaction product of pollen and hydrochloric acid, in a mixture with a liquid vehicle, said mixture having a pH of not more than 7.5.

GEORGE E. ROCKWELL.